(12) United States Patent
Wu et al.

(10) Patent No.: US 12,590,222 B2
(45) Date of Patent: Mar. 31, 2026

(54) TWO-COMPONENT POLYURETHANE COATING COMPOSITION, COATING FORMED FROM THE TWO-COMPONENT POLYURETHANE COATING COMPOSITION AND COATED ARTICLE

(71) Applicant: Sherwin-Williams (Guangdong) New Material Co., Ltd., Foshan City (CN)

(72) Inventors: Libin Wu, Foshan City (CN); Yijiang Liu, Foshan City (CN)

(73) Assignee: SHERWIN-WILLIAMS (GUANGDONG) NEW MATERIAL CO., LTD., Guangdong (CN)

( * ) Notice: Subject to any disclaimer, the term of this patent is extended or adjusted under 35 U.S.C. 154(b) by 498 days.

(21) Appl. No.: 18/001,902

(22) PCT Filed: Jul. 27, 2021

(86) PCT No.: PCT/CN2021/108735
§ 371 (c)(1),
(2) Date: Dec. 15, 2022

(87) PCT Pub. No.: WO2022/022529
PCT Pub. Date: Feb. 3, 2022

(65) Prior Publication Data
US 2023/0227690 A1    Jul. 20, 2023

(30) Foreign Application Priority Data
Jul. 31, 2020    (CN) .......................... 202010756175.0

(51) Int. Cl.
| | |
|---|---|
| *C09D 175/04* | (2006.01) |
| *C08G 18/08* | (2006.01) |
| *C08G 18/67* | (2006.01) |
| *C08G 18/79* | (2006.01) |
| *C08L 75/04* | (2006.01) |
| *C09D 7/20* | (2018.01) |
| *C09D 7/63* | (2018.01) |

(52) U.S. Cl.
CPC ............. *C09D 175/04* (2013.01); *C09D 7/20* (2018.01); *C09D 7/63* (2018.01)

(58) Field of Classification Search
None
See application file for complete search history.

(56) References Cited

U.S. PATENT DOCUMENTS

| | | | |
|---|---|---|---|
| 2005/0020763 A1 | 1/2005 | Milic | |
| 2012/0201963 A1* | 8/2012 | Li | ............................ B05D 1/28 524/871 |
| 2014/0248435 A1* | 9/2014 | Hammerli | ............. C04B 41/009 427/314 |

FOREIGN PATENT DOCUMENTS

| | | | | |
|---|---|---|---|---|
| CA | 2088805 A1 | | 8/1993 | |
| CN | 101885941 B | | 1/2012 | |
| CN | 102796448 A | | 11/2012 | |
| CN | 105368287 A | * | 3/2016 | |
| CN | 105505167 A | | 4/2016 | |
| CN | 105838223 A | | 8/2016 | |
| CN | 104093790 B | | 10/2016 | |
| CN | 104540867 B | | 3/2017 | |
| CN | 106634515 A | | 5/2017 | |
| CN | 106947374 A | * | 7/2017 | ........... G01N 21/643 |
| CN | 109161270 A | * | 1/2019 | ........... C09D 133/00 |
| CN | 109722157 A | | 5/2019 | |
| CN | 109777277 A | | 5/2019 | |
| CN | 109852222 A | * | 6/2019 | |
| CN | 110028859 A | | 7/2019 | |
| CN | 110283512 A | | 9/2019 | |
| CN | 110343234 A | * | 10/2019 | ........... C08G 18/755 |
| CN | 111019504 A | | 4/2020 | |
| CN | 111171696 A | * | 5/2020 | ........... C08G 18/755 |
| CN | 112322166 A | | 2/2021 | |

OTHER PUBLICATIONS

International Search Report & Written Opinion for patent application No. PCT/CN2021/108735 dated Nov. 4, 2021, 13 pages.
Wang, et al. "Study of the Effect of PGDA Solvent on Film Formation and Curing Process of Two-Component Waterborne Polyurethane Coatings by FTIR Tracking" dated May 9, 2020, Coatings 2020, 10, 461; doi:10.3390/coatings10050461, 12 pages.
Chen, et al, "Performance of crosslinking agent on waterborne two-component polyurethane coating" in Paint Industry, Jul. 2022.

* cited by examiner

*Primary Examiner* — Ha S Nguyen
(74) *Attorney, Agent, or Firm* — Tucker Ellis LLP

(57) ABSTRACT

The present application relates to a two-component polyurethane coating composition, a coating formed from the two-component polyurethane coating composition and a coated article. The two-component polyurethane coating composition comprises: component A comprising an aqueous dispersion of at least one hydroxyl functional resin; and component B comprising at least one non-hydrophilic isocyanate curing agent and at least one diluent, wherein the at least one diluent comprises at least one alkyl glycol ester, at least one cyclic carbonate ester, or combinations thereof, and the at least one alkyl glycol ester does not have an ether bond. The coated article of the present application comprises the coating formed from the two-component polyurethane coating composition. The coating composition of the invention adopts a low-cost non-hydrophilic curing agent, and the formed coating has improved gloss or transparency.

13 Claims, No Drawings

TWO-COMPONENT POLYURETHANE COATING COMPOSITION, COATING FORMED FROM THE TWO-COMPONENT POLYURETHANE COATING COMPOSITION AND COATED ARTICLE

CROSS REFERENCE TO RELATED APPLICATION

The present application is the National Stage filing under 35 U.S.C. 371 of International Application No. PCT/CN2021/108735 filed on Jul. 27, 2021, which itself claims priority to Chinese Patent Application No. 202010756175.0 entitled "TWO-COMPONENT POLYURETHANE COATING COMPOSITION, COATING FORMED FROM THE TWO-COMPONENT POLYURETHANE COATING COMPOSITION AND COATED ARTICLE" and filed on Jul. 31, 2020, which is incorporated herein by reference in its entirety.

TECHNICAL FIELD

The present application relates to a two-component polyurethane coating composition and a coated article. Specifically, the present application relates to a coating composition comprising an aqueous dispersion and a non-hydrophilic curing agent, and relates to a coated article comprising the coating formed from the two-component polyurethane coating composition.

BACKGROUND

Traditional oil based two-component polyurethane coatings are widely used because of their good acid resistance, high gloss, stain resistance and scratch resistance. However, with the increasing attention to environmental protection and the implementation of new environmental regulations, the application of the traditional oil-based two-component polyurethane coatings are limited due to its high VOC content.

In order to replace the traditional oil-based two-component polyurethane coatings, water-based two-component polyurethane coatings have attracted more and more attention. In the existing water-based two-component polyurethane coatings, a modified hydrophilic curing agent is used to allow formation of a stable dispersion from the curing agent and a film-forming resin. However, such modified hydrophilic curing agent usually involves complex synthesis process and raw materials, which greatly increases the cost of coatings and affects the popularization and application of water-based coatings. Moreover, the coatings formed by the existing water-based two-component polyurethane coatings usually show relatively poor coating properties, such as low gloss.

SUMMARY

In view of this, in the coating industry, there is still a need for a two-component polyurethane coating composition that has relatively low cost, meanwhile the cured coating shows excellent coating properties, especially gloss or transparency.

The above goal can be achieved by the coating composition as described herein.

A first aspect of the present application provides a two-component polyurethane coating composition comprising: component A comprising an aqueous dispersion of at least one hydroxyl functional resin; and component B comprising at least one non-hydrophilic isocyanate curing agent and at least one diluent, wherein the at least one diluent comprises at least one alkyl glycol ester, at least one cyclic carbonate ester or combinations thereof, and the at least one alkyl glycol ester does not have an ether bond.

A second aspect of the present application provides a coating formed from the two-component polyurethane coating composition as described herein.

A third aspect of the present application provides a coated article, comprising a substrate; and the coating or a cured coating formed by the two-component polyurethane coating composition as described herein, at least partially coated on the substrate.

In the two-component polyurethane coating composition described herein, at least one alkyl glycol ester, at least one cyclic carbonate or combinations thereof are used as diluent, and at least one low-cost non-hydrophilic isocyanate curing agent is used. The inventors have found that the coating formed after curing exhibits excellent coating properties, especially gloss or transparency. In some preferred embodiments, excellent gloss and transparency are obtained at the same time.

Moreover, when the coating composition of the application is applied, a stable dispersion can be formed by manually stirring component A and component B, without need of a strong dispersion process (such as high-speed stirring). It's very surprising. Because in general, the compatibility between a non-hydrophilic curing agent and an aqueous dispersion is poor, and it is easy to cause phase separation. Therefore, a strong dispersion process (such as high-speed stirring) must be adopted to successfully disperse a non-hydrophilic curing agent and an aqueous dispersion.

In addition, some embodiments of the present application also exhibit a faster drying rate and an improved pot life.

The details of one or more embodiments of the application will be set forth in the description below. The other features, objectives, and advantages of the invention will become apparent.

Definition

As used herein, "a", "an", "the", "at least one", and "one or more" are used interchangeably. Thus, for example, a coating composition that comprises "an" additive can be interpreted to mean that the coating composition includes "one or more" additives. As used herein, the singular forms are intended to include the plural forms as well, unless the context clearly indicates otherwise.

Throughout the present application, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned in this invention, as along as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, it should be understood that any lower limit may be combined with any upper limit to recite a range not explicitly recited, as well as, any lower limit may be combined with any other lower limit to recite a range not explicitly recited, in the same way, any upper limit may be combined with any other upper limit to recite a range not explicitly recited.

Unless otherwise indicated, the recitations of numerical ranges by endpoints include all numbers subsumed within that range. For example, a range of from 1 to 5 includes 1, 1.5, 2, 2.75, 3, 3.80, 4, 5, etc. Furthermore, disclosure of a range includes disclosure of all subranges included within the broader range. For example, a range of from 1 to 5 discloses the subranges of from 1 to 4, from 1.5 to 4.5, from 1 to 2, etc. Thus, every point or individual value may serve as a lower or upper limit combined with any other point or individual value or any other lower or upper limit, to recite a range explicitly recited in the present application.

As used herein, "or" refers to an inclusive. That is, the phrase "A or B" means "A, B, or both A and B", which can also be abbreviated as "A and/or B". More specifically, a condition A or B is satisfied by any one of the following: A is true (or present) and B is false (or not present): A is false (or not present) and B is true (or present); and both A and B are true (or present). In contrast, the exclusive "or" is represented herein, for example, by terms such as "either A or B" and "one of A or B".

In the context of describing that a composition does not contain or is free of an ingredient, the phrases "does not contain" and "is free of" mean that the composition does not contain the ingredient intentionally added. Under the consideration of the complexity of components of a specific composition in the actual preparation process, the phrases "does not contain a certain component" and "is free of a certain component" can be understood to mean that the composition contains less than 1 wt. % (weight %) of the component, more preferably less than 0.5 wt. %, even more preferably less than 0.2 wt. %, most preferably less than 0.1 wt. % of the component, relative to total weight of the composition.

The term "dispersion" herein conforms to the definition in the IUPAC Compendium of Chemical Terminology (2007), which defines a dispersion to be a material comprising more than one phase, where at least one of the phases consists of finely divided phase domains, often in the colloidal size range, distributed throughout a continuous phase domain.

As used herein, the term "aqueous dispersion" refers to a dispersion in which the dispersion medium (solvent or carrier fluid) mainly or primarily contains water. For example, in some embodiments, the dispersion medium comprises at least about 50 wt. %, preferably at least about 60 wt. %, more preferably at least 70 wt. % and at most about 99 wt. % and at most about 100 wt. % of water, based on the total weight of the dispersion medium.

As used herein, the term "aqueous dispersion" of a resin refers to a stable dispersion of resin (i.e., polymer) in the form of particles in an aqueous liquid medium, optionally with the aid of suitable dispersion aids such as surfactants, cosolvents. Therefore, in the present application, when used for polymers, unless otherwise stated, the terms "aqueous emulsion", "aqueous latex" and "aqueous dispersion" may be used alternately. Aqueous latex may be prepared by methods known in the field, for example, by emulsion polymerization process known by technicians in this field. Aqueous dispersions are also commercially available.

As used herein, the term "hydroxyl functional" means a subject containing at least one unreacted hydroxyl functional group.

As used herein, the terms "hydrophilic curing agent" and "non-hydrophilic curing agent" have well-known meanings in the art. Generally, a non-hydrophilic curing agent (also known as hydrophobic curing agent or oleophilic curing agent) is difficult to mix evenly with water or aqueous component A, and it is prone to cause phase separation. Examples of non-hydrophilic curing agents include, for example, most of unmodified polyisocyanates. Hydrophilic curing agent is usually obtained by hydrophilic modification of a curing agent. The hydrophilic curing agent can be, for example, non-ionic type hydrophilically-modified (for example, Bayhydur 3100 available from Covestro), ionic type modified, and non-ionic type and ionic type composite modified.

Working time or useable life or pot life is the time within which, once the mutually reactive components of a coating composition have been mixed, the coating composition may still be properly processed or applied and coatings of unimpaired quality can be achieved. The handling of two-component coating compositions generally requires mixing together the reactive components shortly before application to avoid premature reaction of the reactive components. The term "shortly before application" is well-known to a person skilled in the art working with two-component coating compositions. The time period within which the ready-to-use coating composition may be prepared prior to the actual use/application depends, e.g., on the pot life of the coating composition. Therefore, a sufficient long pot life is desired in order to have a comfortable time window for preparing/mixing and applying the two-component coating compositions. Thus, working time may also be defined as the amount of time for a coating to reach the required performance. In general, at the end of the working time, the viscosity of the coating will double. In addition, due to the differences between water-based resin and oil-based resin, viscosity alone cannot be used as the only standard to determine the working time. For a water-based dispersion, the transparency, fullness, gloss and hardness of the film cannot be significantly reduced at the end of the workable time.

As used herein, the term "cured" means that the condition of a liquid composition in which an applied film of the composition is at least set-to-touch as defined in ASTM D 5895-Standard Test Methods for Evaluating Drying or Curing During Film Formation of Organic Coatings Using Mechanical Recorder, which is hereby incorporated herein by reference. As used herein, "cure" and "curing" refer to the progression of an applied liquid composition from the liquid state to a cured state. The terms "cured", "cure", and "curing" encompass drying of compositions through solvent evaporation and chemical crosslinking of components in compositions.

The terms "comprises", "having", "including", "incorporating", and variations thereof do not have a limiting meaning, but rather these terms in the description and claims are intended to be open-ended.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

According to the first aspect of the present disclosure, a two-component polyurethane coating composition is provided. The two-component polyurethane coating composition usually comprises: component A (i.e. resin component) and component B (i.e. curing agent component).

The component A comprises a compound having a functional group reactive to the curing agent, the functional group having active hydrogen. In the coating composition of the present application, the component A comprises an aqueous dispersion of at least one hydroxyl functional resin. In some embodiments, the at least one hydroxyl functional resin has a hydroxyl content (calculated based on the solid resin) of about 2 wt % or more, preferably 3 wt % or more. The at least one hydroxyl functional resin may have a hydroxyl content (calculated based on the solid resin) of about 6 wt % or lower, preferably 5 wt % or lower.

The hydroxyl functional resin includes such as hydroxyl functional acrylic resin, hydroxyl functional polyurethane resin, hydroxyl functional alkyd resin, hydroxyl functional polyester resin, hydroxyl functional polyether resin or hydroxyl functional epoxy resin, etc.

Hydroxyl functional acrylic resin may be can be prepared by free-radical polymerization of polymerizable, olefinically unsaturated monomers, optionally in presence of oligomeric or polymeric polyester and/or polyurethane resins. Free-radically polymerizable, olefinically unsaturated monomers, which may be used are monomers which, in addition to at least one olefinic double bond, also contain further functional groups and monomers which, apart from at least one olefinic double bond, contain no further functional groups. Further functional groups may be, for example, urea, hydroxyl, carboxyl, sulfonic acid, silane, amine, amide, acetoacetate, phosphoric, phosphonic, heterocyclic or epoxy groups. In the preparation of the hydroxyl functional acrylic resin, those functional groups which do not tend to self-crosslink are properly combined.

Olefinically unsaturated monomers with hydroxyl groups are used to introduce hydroxyl groups into the (meth)acrylic copolymers. Suitable hydroxyl functional unsaturated monomers are, for example, hydroxyalkyl esters of alpha, beta-olefinically unsaturated monocarboxylic acids with primary or secondary hydroxyl groups. These may, for example, comprise the hydroxyalkyl esters of acrylic acid, methacrylic acid, crotonic acid, maleic acid, fumaric acid, itaconic acid, isocrotonic acid or any combinations thereof. The hydroxyalkyl esters of (meth)acrylic acid are preferred. Further olefinically unsaturated monomers with hydroxyl groups may, of course, also be used.

Carboxyl functional olefinically unsaturated monomers are used to introduce carboxyl groups into the (meth)acrylic copolymers. Examples of suitable olefinically unsaturated carboxylic acids include acrylic acid, methacrylic acid, crotonic acid and isocrotonic acid, itaconic acid, maleic acid, fumaric acid and the halfesters of these difunctional acids. Acrylic and methacrylic acid are preferred.

Unsaturated monomers which, apart from at least one olefinic double bond, contain no further functional groups are, for example, aliphatic esters of olefinically unsaturated carboxylic acids, such as (meth)acrylic acid, vinyl esters and/or vinylaromatic hydrocarbons such as styrene.

Also, other additional unsaturated monomers, which contain apart from an olefinic double bond further functional groups can be used.

Appropriate hydroxyl functional polyurethane resins which may be used are, for example, prepared by reacting compounds which are reactive with respect to isocyanate groups and polyisocyanates having at least 2 free isocyanate groups per molecule. Polyols of high molecular weight can be used as compounds which are reactive with respect to isocyanate groups. Examples of polyols may include polyacrylate polyols, polyester polyols, polyether polyols, polycarbonate polyols and polyurethane polyol. Preferably, polyester polyols, polyether polyols, polycarbonate polyols or any combinations thereof, with a molecular weight of for example 500-6000 g/mol, are used. Examples of useful polyisocyanates are phenylene diisocyanate, xylylene diisocyanate, diphenylmethane diisocyanate, isophorone diisocyanate, dicyclohexylmethane diisocyanate, tetramethylene diisocyanate, hexamethylene diisocyanate, trimethyl hexamethylenediisocyanate.

Other available hydroxyl functional alkyd resin, hydroxyl functional polyester resin, hydroxyl functional polyether resin and hydroxyl functional epoxy resin are known in the art. Those skilled in the art can reasonably determine a suitable resin that can be used in component A.

Particularly preferably, the component A comprises a hydroxyacrylic acid dispersion. Suitable hydroxyacrylic acid dispersions can also be commercially available, such as Bayhydrol® Series of products from Covestro.

Based on the total weight of the component A, the component A may contain, for example, 30-70 wt. % water, for example about 45 wt. %, about 50 wt. % or about 60 wt. % water. Optionally, the component A may further contain at least one cosolvent. If present, the amount of optional cosolvent is low. For example, the component A may contain up to 15 wt. %, preferably up to 10 wt. % of a cosolvent.

The cosolvent can be an organic solvent commonly used in the art. For example, the cosolvent can be monohydric alcohols or polyols, such as propanol, butanol and hexanol; glycol ethers or esters, such as diethylene glycol dialkyl ethers having a C1-C6 alkyl group, dipropylene glycol dialkyl ethers having a C1-C6 alkyl group, ethoxypropanol, and butyl glycol: diols, such as ethylene glycol and propylene glycol; and ketones, such as methyl ethyl ketone, acetone, cyclohexanone: N-methyl pyrrolidone, N-ethyl pyrrolidone: aromatic or aliphatic hydrocarbons, such as toluene, xylene, or straight-chain or branched aliphatic C6-C12 hydrocarbons. Preferably, the cosolvent is water miscible. Examples of cosolvents include, but are not limited to, ethanol, isopropanol, butanol, butoxydiglycol, butyl glycol, dipropylene glycol methyl ether (DPM), propylene glycol methyl ether, ethylene glycol butyl ether, dipropylene glycol butyl ether (DPnB), ethylene glycol ethyl ether, ethylene glycol monomethyl ether, ethylene glycol monohexyl ether, ethylene glycol monon-butyl ether, diethylene glycol monomethyl ether, diethylene glycol monon-butyl ether, tripropylene glycol monomethyl ether, ethylene glycol monoisobutyl ether, diethylene glycol monoisobutyl ether, propylene glycol monoisobutyl ether, ethylene glycol monophenyl ether, propylene glycol monophenyl ether, ethylene glycol monomethyl ether acetate, acetone, methyl ethyl ketone, methyl isobutyl ketone, cyclohexanone, toluene, xylene, trimethylbenzene, solvent naphtha-100, solvent naphtha-150, solvent naphtha-180, solvent naphtha-200, 2-methoxypropyl acetate and n-butyl acetate and any combinations thereof.

Based on the total weight of the coating composition, the amount of cosolvent may be about 4-10 wt. %, preferably about 5-9 wt. %, more preferably about 6-8 wt. %. For example, the amount of cosolvent can be even more preferably about 6.5 wt. %, 7 wt. %, 7.5 wt. % or 8 wt. %, based on the total weight of the coating composition.

The coating composition of the application can also optionally contain pigments, other additives or any combinations thereof.

In some preferred embodiments, the pigments may be in shape of sphere, fiber, flake, or other regular or irregular shapes of micrometric or even nanometric size. Suitable examples of pigments include metal oxides such as titanium dioxide, iron oxides, zinc oxide, zirconia, or aluminia; metal composite oxides containing two or more metal elements including manganese, nickel, titanium, chromium, antimony, magnesium, cobalt, iron, or aluminum; oxymetallic compounds, such as bismuth vanadate, cobalt aluminate, cobalt zincate, or zinc chromate; metallic pigments, such as aluminum flake, copper, and copper-zinc alloys; and pearlescent pigments, such as lead carbonate and bismuth oxychloride; talc; and any combinations thereof. The pigment is preferably titanium dioxide, more preferably titanium dioxide in powder form. Particularly preferably, the pigment comprises rutile titanium dioxide. All of these types of thickeners are commercially available. For example, titanium dioxide pigment BLR-688 available from Billions may be used as an example of the pigment.

The total amount of the pigment may be from 0% to 50 wt. %, for example, from 1 wt. % to 45 wt. %, from 2 wt. % to 40 wt. %, from 3 wt. % to 35 wt. %, from 4 wt. % to 30 wt. %, from 5 wt. % to 25 wt. %, from 10 wt. % to 20 wt. %, based on the total weight of the coating composition. Further preferably, the amount of each pigment is independently of from 0% to 50 wt. %, from 1 wt. % to 40 wt. %, from 2 wt. % to 30 wt. %, from 3 wt. % to 20 weight. %, or from 4 wt. % to 15 wt. %, based on the total weight of the coating composition.

In the coating compositions, optional other additives may be those commonly used in coating compositions. Those additives do not adversely affect the coating composition or a cured coating resulting therefrom. Suitable additives include those agents which can, for example, improve the manufacturing, processing of the composition, enhance composition esthetics, improve a particular functional property or characteristics (for example, the adhesion to a substrate) of a coating composition or a cured coating resulting therefrom. Depending on the particular needs, the additives that may be present in the coating composition include, but not limited to, fillers, anti-skinning agents, driers, emulsifiers, packing materials, anti-migration aids, antibacterial agents, chain extenders, lubricants, wetting agents, biocides, plasticizers, defoamers, colorants, waxes, antioxidants, anticorrosive agents, anti-freezing agents, rheological aids, thickeners, dispersants, adhesion promoters, UV stabilizers, pH adjusters, leveling agents or combinations thereof. The amount of each of optional ingredients is sufficient to achieve its intended purpose, but preferably such amount does not adversely affect the coating composition or the cured coating derived therefrom.

Further preferably, the coating composition also includes 0.1-1 wt. % of other additives, based on the total weight of the coating composition. The other additives include one or more of defoamers, leveling agents, thickeners, wetting agents or combinations thereof.

As an example of the leveling agents, BYK 358 available from BYK may be used. As an example of the defoamers, BYK-071 available from BYK may be used.

Suitable thickeners include cellulose thickener, alkali swelling thickeners, polyurethane thickeners, hydrophobically modified polyurethane thickeners, inorganic thickeners or combinations thereof. All of these types of thickeners are commercially available products. For example, as an example of cellulose thickener, hydroxyethyl cellulose thickener PLUS 250 H4B4 commercially available from ASHLAND Company, USA, may be used. As an example of alkali swelling thickener, ASE60 commercially available from Dow Chemical Co., USA may be used. RM-2050D commercially available from Dow Chemical Co., USA, U902 or U903 commercially available from Wanhua Chemical Group may be used as examples of polyurethane thickener. As an example of an inorganic thickener, bentonite can be used.

The coating composition of the present application may optionally comprise defoamers. Suitable defoamers may include organic siloxane defoamers, oil defoamers, polyether defoamers, polyether-modified organic silicone defoamers, or combinations thereof. For example, non-ionic mineral oil may be used. All of these types of defoamers are commercially available products. As an example of defoamers, CF246 commercially available from Blackburn Chemicals can be used.

In the two-component polyurethane coating composition of the present application, the component B comprises at least one non-hydrophilic isocyanate curing agent. In some embodiments of the present application, the at least one non-hydrophilic isocyanate curing agent comprises aliphatic diisocyanate, aromatic diisocyanate, cycloaliphatic diisocyanate, or any combinations thereof. Preferably, the non-hydrophilic isocyanate curing agent comprises an aliphatic diisocyanate.

Preferably, the non-hydrophilic isocyanate curing agent has a NCO content in a range of from 10 wt. % to 30 wt. %. Preferably, the NCO content is in a range of from 15 wt. % to 25 wt. %. For example the NCO content may be 18 wt. %, 21 wt. %, 22 wt. %, 23 wt. %, or 24 wt. %. The NCO content may be determined according to DIN EN ISO 11 909.

Preferably, the non-hydrophilic isocyanate curing agent having a low viscosity is used. For example, the non-hydrophilic isocyanate curing agent has a viscosity at 23° C. of lower than 4000 mPa·s. More preferably, the non-hydrophilic isocyanate curing agent has a viscosity at 23° C. of at least 600 mPa·s and lower than 4000 mPa·s. For example, the viscosity at 23° C. of the non-hydrophilic isocyanate curing agent may be 730, 1000, 1500, 2000 or 3000 mPa·s. The viscosity as mentioned above is determined according to DIN EN ISO 3219/A.3.

The non-hydrophilic isocyanate curing agent may be in the form of oligomer or homopolymer. The oligomer or homopolymer can be oligomer or homopolymer containing 2-8 monomer units. For example, the non-hydrophilic isocyanate curing agent may be a trimer.

Examples of non-hydrophilic isocyanate curing agents include isocyanate curing agents based on hexamethylene diisocyanate (HDI), dicyclohexylmethane-4,4-diisocyanate (HMDI), phenylenedimethylene diisocyanate (XDI) or tetramethylisophtylene diisocyanate (TMXDI).

In some preferred embodiments, the aliphatic diisocyanate may be one or more of aliphatic diisocyanates based on hexamethylene diisocyanate (HDI), particularly preferably HDI trimers. Preferably, the aliphatic diisocyanate may comprise one or more of HDI based asymmetric trimers, symmetric trimers and homopolymers. Commercially available isocyanate curing agents may be used, such as DESMODUR N 3300, 3600 and 3900.

Non-hydrophilic isocyanate curing agents may be used alone or in combination. In some embodiments, the non-hydrophilic isocyanate curing agent may also include a combination of two or more of the curing agents described above. For example, in an exemplary embodiment, DESMODUR N 3300, 3600 and 3900 in a 1:1:1 weight ratio can be used as non-hydrophilic isocyanate curing agents.

The component B may or may not contain hydrophilic isocyanate curing agent.

In some embodiments, the component B comprises at least one hydrophilic isocyanate curing agent. The hydrophilic isocyanate curing agent may be prepared by modification in a way known in the art. Examples of hydrophilic isocyanate include, but are not limited to, hydrophilic isocyanates based on isophorone diisocyanate (IPDI) and hydrophilic isocyanates based on HDI.

In some embodiments, the weight ratio of the at least one non-hydrophilic isocyanate curing agent to the at least one hydrophilic isocyanate curing agent is in the range of from 99:1 to 5:95. Preferably, the weight ratio of the at least one non-hydrophilic isocyanate curing agent to the at least one hydrophilic isocyanate curing agent is in the range of from 90:10 to 10:90, more preferably from 80:20 to 20:80. For example, the weight ratio of the at least one non-hydrophilic isocyanate curing agent to the at least one hydrophilic isocyanate curing agent is in the range of 90:10, 70:30, 50:50, 30:70 or 10:90.

In the two-component polyurethane coating composition described herein, the component B comprises at least one diluent. Diluents may include at least one alkyl glycol esters, at least one cyclic carbonates, or combinations thereof. In some preferred embodiments, the diluent comprises at least one alkyl glycol esters.

It should be noted that the at least one alkyl glycol esters do not contain ether bonds. Without wishing to be bound by theory, according to the general knowledge in the art, ether oxygen can promote the compatibility of the compound with water due to the formation of potential hydrogen bonds. However, the inventors have surprisingly found that in the two-component polyurethane coating composition of the present application, if the organic solvent containing ether oxygen bond is used as diluent alone, it is unfavorable to stable dispersibility between the aqueous dispersion and curing agent, resulting in low gloss or transparency of the obtained coating.

In some embodiments, the weight ratio of the at least one diluent to the at least one non-hydrophilic isocyanate curing agent is in the range of from 30:70 to 90:10. More preferably, the weight ratio of the at least one diluent to the at least one non-hydrophilic isocyanate curing agent is in the range of from 40:60 to 85:15. For example, the weight ratio of the at least one diluent to the at least one non-hydrophilic isocyanate curing agent is in the range of 45:65, 50:50, 55:45, 60:40, 70:30 or 80:20.

In the component B, at least one alkyl glycol ester, at least one cyclic carbonate ester or combinations thereof may be used as the diluent to dilute the non-hydrophilic isocyanate curing agent. In some preferred embodiments, the weight ratio of the alkyl glycol ester, the cyclic carbonate ester or combinations thereof (when the combination of alkyl glycol ester and the cyclic carbonate ester is present) and the non-hydrophilic isocyanate curing agent is from 30:70 to 90:10. More preferably, the weight ratio of the alkyl glycol ester, the cyclic carbonate ester or combinations thereof (when the combination of alkyl glycol ester and cyclic carbonate ester is present) and the non-hydrophilic isocyanate curing agent is from 40:60 to 85:15. For example, the weight ratio of the alkyl glycol ester, the cyclic carbonate ester or combinations thereof (when the combination of alkyl glycol ester and cyclic carbonate ester is present) and the non-hydrophilic isocyanate curing agent may be 45:65, 50:50, 55:45, 60:40, 70:30 or 80:20.

The inventors have found that transparency and gloss of the cured coating can be further improved by changing the relative amount of diluent and non-hydrophilic curing agent and adjusting in the appropriate range.

Preferably, the alkyl glycol ester has a relatively low molecular weight, for example less than 250 g/mol. More preferably, the alkyl glycol ester has a molecular weight of 200 g/mol or less. The alkyl glycol esters especially include dicarboxylic esters of alkyl diols. In some preferred embodiments, the alkyl glycol esters include propylene glycol diacetate (PGDA), ethylene glycol diacetate (EGDA) and ethylene glycol dipropionate (EGDP). Particularly preferably, the alkyl glycol ester includes propylene glycol diacetate (PGDA), ethylene glycol diacetate (EGDA), or combinations thereof. In some preferred embodiments, the alkyl glycol ester is propylene glycol diacetate. In some other preferred embodiments, the alkyl glycol ester is ethylene glycol diacetate.

In some other preferred embodiments, the diluent comprises a cyclic carbonate ester. Generally speaking, cyclic carbonate esters are a class of compounds, in contrast to linear carbonate esters. The cyclic carbonate ester has a carbonate ester ring, preferably a five-membered ring. In some embodiments, the cyclic carbonate has a molecular weight of less than 200 g/mol, such as less than 180 g/mol, less than 150 g/mol, or less than 120 g/mol. In some embodiments, the cyclic carbonate ester does not contain an ether bond. Preferably, the cyclic carbonate ester comprises ethylene carbonate (EC), propylene carbonate (PC), 1,2-butylene carbonate, 2,3-butylene carbonate, or combinations thereof.

The diluent may consist of at least one alkyl glycol esters, at least one cyclic carbonate esters or their combinations. For example, the diluent may consist of any one or more of alkyl glycol esters described herein. For example, the diluent may also consist of any one or more of cyclic carbonate esters described herein.

In some embodiments, the diluent may also contain at least one low-boiling point solvent. Boiling point herein has a general meaning understood by those skilled in the art. "Boiling point" is understood as the temperature at which a liquid boils under normal pressure (i.e. 1 bar), that is, the temperature at which the saturated vapor pressure of the liquid is equal to the surrounding pressure. The value of boiling point for a compound can be obtained through scientific literature or reference books.

The inventors have also surprisingly found that by adding low-boiling point solvent to the diluent containing at least one alkyl glycol ester, at least one cyclic carbonate ester or combinations thereof, curing time of the coating composition can be shortened while maintaining good gloss. For example, compared with a diluent containing no additional low-boiling point solvent, use of the diluent containing low-boiling point solvent can shorten the touch drying time by about 25%, or even halve it. This is highly desirable in applications that require faster drying.

Preferably, the at least one low-boiling point solvent has a boiling point of 160° C. or less. Example of the at least one low-boiling point solvent comprises propylene glycol monomethyl ether acetate (PMA), dipropylenediol dimethyl ether (DMM), methyl ethyl ketone (MEK), acetone, methyl isobutyl ketone, cyclohexanone, toluene, xylene, trimethylbenzene, solvent naphtha 100, 2-methylpropanol acetate (MPA), n-butyl acetate (BAC) or combinations thereof. More preferably, the low-boiling point solvents are PMA, MEK or a combination of both.

In some embodiments, the total weight of the at least one alkyl glycol esters and the at least one cyclic carbonate esters (if present) is from about 10 wt. % to 100 wt. %, preferably from about 20 wt. % to 90 wt. %, and more preferably from about 30 wt. % to 80 wt. %, based on the weight of the diluent. For example, the total weight of the at least one alkyl glycol esters and the at least one cyclic carbonate esters (if present) is about 25 wt. %, 40 wt. %, 50 wt. %, 60 wt. %, or 70 wt. % of the diluent.

In order to obtain excellent gloss or transparency of film, the two-component polyurethane coating composition obtained by mixing component A and component B has a particle size in the range of from 10 nm to 1000 nm. Preferably, the composition obtained by mixing component A and component B has a particle size of less than 800 nm. The particle size refers to the hydrodynamic diameter obtained by dynamic light scattering test. The inventors have found that when a peak larger than 1 micron is present in particle size distribution of the composition obtained by mixing component A and component B under dynamic light scattering, it may cause poor dispersion and affect the gloss and transparency of the film.

In some embodiments, during operation and application, the component A and component B can be mixed at a low speed (such as by manual stirring) to obtain an applicable coating composition. For example, the component A and component B can be stirred and mixed at a shear rate of $10\text{-}10^4 \text{ s}^{-1}$, preferably at a shear rate of $10^2\text{-}10^3 \text{ s}^{-1}$ to obtain an applicable coating composition.

Generally speaking, the compatibility between non-hydrophilic curing agent and aqueous dispersion is poor, and it is easy to cause phase separation. In the traditional researches on the two-component coating composition composed of non-hydrophilic curing agent and aqueous dispersion, it is definitely required to adopt strong dispersing process (such as high-speed stirring) so that a stable dispersion of non-hydrophilic curing agent and aqueous dispersion may be obtained temporarily. However, the inventors have surprisingly found that the coating composition of the present application is capable of forming a stable dispersion by manual stirring, without strong dispersing process (such as high-speed stirring).

Moreover, the two-component polyurethane coating composition described herein can obtain a longer pot life during operation and application. For example, the two-component polyurethane coating composition has a pot life of at least 4 hours after mixing the component A and the component B. In some embodiments, the two-component polyurethane coating composition has a pot life of from 4 to 6 hours. This is usually very desirable, especially for wood coatings, because the coating personnel have sufficient time window in application, so that they can arrange and manage a reasonable application process calmly, so as to obtain optimal coating effect and efficiency.

Depending on actual needs, the two-component polyurethane coating composition or the component A may further comprises additives. For example, the additives include, but not limited to, pigments, fillers, anti-skinning agents, driers, emulsifiers, anti-migration aids, antibacterial agents, chain extenders, lubricants, wetting agents, biocides, plasticizers, defoamers, colorants, waxes, antioxidants, anticorrosive agents, anti-freezing agents, rheological aids, thickeners, dispersants, adhesion promoters, UV stabilizers, pH adjusters, leveling agents or combinations thereof. The amount of each of optional ingredients is sufficient to achieve its intended purpose, but preferably such amount does not adversely affect the coating composition or the cured coating derived therefrom.

A second aspect of the present application provides a coating formed from the two-component polyurethane coating composition as described herein. Preferably, the coating described herein has a transparency of 95% or higher. For example, the transparency of the coating can be up to 96%, 97%, 98% or 100%. Even in some particularly preferred embodiments, the transparency of the coating may exceed 100%. That is, after the coating described herein is formed on the substrate, the overall transparency of the substrate and the coating is better than that of the substrate itself. This may be because the coating composition described herein can further make up for some minor defects on the surface of the substrate itself, forming a closer bonding between the substrate and the coating and thus reducing the decrease of transparency caused by the defects on the surface of the substrate itself. Transparency is expressed by the percentage of light transmittance after coating on the substrate, relative to light transmittance of the substrate itself before coating.

The gloss of the coating described herein may be characterized by 20° gloss, 60° gloss or both. Preferably, the 60° gloss is greater than 88, more preferably 89 or higher, even more preferably 90 or higher. Gloss can be measured by methods and instruments known in the art.

In addition, it should be noted that when the transparency reaches 95% or more or the gloss reaches 80 or more, the difference of the values measured by experimental instruments is smaller and smaller, compared with the actual difference observed by the human eye. In other words, when the transparency reaches 95% or more or the gloss reaches 80 or more, the small difference between the values measured by the experimental instrument actually means that the actual coatings has significantly different performance. Therefore, when the transparency reaches 95% or more or the gloss reaches 80 or more, the difference of the values measured by the experimental instrument is only 1% or 1, a significantly different transparency or gloss is actually observed by human eyes. For example, a 60° gloss coating with a result of 87 is obviously inferior to a 60° gloss coating with a result of 90 in the eyes of consumers; Or, a coating with 95% transparency is actually much better or more transparent than a coating with 90% transparency. Even in some applications, a 60° gloss below 87% and transparency below 93% are not acceptable.

A third aspect of the present application provides a coated article, comprising a substrate; and a coating or a cured coating formed by the two-component polyurethane coating composition as described herein, at least partially coated on the substrate. Examples of substrate may be selected from wood, wood composite, metal, plastic, paper, leather, ceramic, inner wall, outer wall, cement board, or combinations thereof.

Particularly preferably, the substrate is wood. The two-component polyurethane coating composition described herein shows excellent applicability, especially when applied to wood. Generally, in contrast to a coating composition for application on metal substrate, a coating composition for application on wood requires a long pot life. The coating composition has as described herein is particularly suitable for application on wood, because of the pot life of from 4 hours to 6 hours.

The aqueous coating composition of the application can be applied by conventional methods known to those skilled in the art. Preferably, the coating composition is applied by brushing, spraying and other coating methods known in the art. In this way, a coating can be formed from the coating composition of the present application, and the resulting coating also falls within the protection scope of the present application. Thus, the present application also provides a coating that can be obtained from the coating composition described herein.

Unless otherwise specified, the various features described herein and the corresponding preferred methods can be combined.

EXAMPLES

The present application is more particularly described in the following examples that are intended as illustrations molar ratio=1.5:1 and stirred manually (at a shear rate of about $10^2$-$10^3$ s$^{-1}$) to obtain a stable dispersion. Before, water was added to adjust the viscosity to about 40 s (with Cup 4).

The dry films had a thickness of about 40 μm. The properties of dry films (including 60° gloss, transparency and contact drying time) was shown in Table 1.

TABLE 1

| Sample No. | Diluent | Weight ratio of curing agent to diluent | 60° gloss | Transparency (%) | Touch drying time (h) |
|---|---|---|---|---|---|
| Sample 1 | PGDA | 5:5 | 90-94 | 100 | 2 |
| Sample 2 | PGDA | 6:4 | 90-92 | 100 | 2 |
| Sample 3 | Ethyl acetate (EtOAc) | 6:4 | 87 | 95-97 | 1 |
| Sample 4 | Methyl ethyl ketone (MEK) | 6:4 | 80 | 95-97 | 1 |
| Sample 5 | Ethyl 3-ethoxypropionate (EEP) | 6:4 | 87 | 95-97 | 1.5 |
| Sample 6 | Dipropylenediol dimethyl ether (DMM) | 6:4 | 80 | 95-97 | 1 |
| Sample 7 | Propylene glycol monomethyl ether acetate (PMA) | 6:4 | Matte | 90-92 | 1 |
| Sample 8 | N-butyl acetate (BAC) | 6:4 | Matte | 90-92 | 1 |
| Sample 9 | Dibasic ester (DBE) | 6:4 | Matte | — (whitening) | >3 h |
| Sample 10 | Butyl glycol acetate (BGA) | 6:4 | Matte | — (obviously hazy) | >3 h |
| Sample 11 | PGDA + Propylene glycol monomethyl ether acetate (PMA) | 6:(1:3) | 90 | 95-97 | 1 |
| Sample 12 | PGDA + PMA | 6:(2:2) | 91 | 95-97 | 1.5 |
| Sample 13 | PGDA + PMA | 6:(3:1) | 91 | 95-97 | 2 |
| Sample 14 | PGDA + MEK | 6:(2:2) | 90-92 | 95-97 | 1 | only. Embodiments of the invention are not limited to these specific examples. Unless otherwise noted, all parts, percentages, and ratios reported in the following examples are on a weight basis. In addition, all reagents used in the examples are commercially available and used directly without further treatment. For example, in the following examples, Bayhydrol A XP 2770, an aqueous dispersion of an exemplary hydroxyl functional resin, is commercially available from Covestro. Those skilled in the art can easily purchase or prepare the raw materials used in the embodiment.

Test Methods

Transparency:

A sample was applied on a transparent glass substrate having a thickness of 2 mm. The resulting paint film was tested at 550 nm, 430 nm and 395 nm by a transparency meter to give transmittance of the paint film. The percentage of the transmittance relative to the substrate without the paint film was recorded. For each sample, three points were measured in parallel. The averaged value was expressed as a percentage.

Gloss:

Gloss meter produced by BYK company in Germany was used to measure 20° and 60° gloss.

Touch Drying Time:

The time when a coating changes from liquid state to the state without showing indentation or adhesion when its surface is gently pressed by a finger.

Example 1

Bayhydrol A XP 2770 was used as an aqueous dispersion of base resin, i.e. component A. Desmodur N3600 was used as a curing agent, and diluted with the diluents shown in Table 1 below and the weight ratio of curing agent to diluent, to obtain a curing agent component, i.e. component B. The component A and component B were mixed in a NCO/OH It can be seen from table 1 that by using PGDA alone as a diluent, excellent gloss and transparency, especially the transparency as high as 100%, are obtained. It can be seen from samples 3-10 that by using other solvents commonly used in coating composition as diluents alone, the gloss is reduced. Even, matte coatings are formed for samples 7-10.

In samples 11-14, the mixture of PGDA and other solvents also provide excellent gloss with the transparency remained greater than 95. More importantly, samples 11-12 and 14 showed significantly shorter touch drying time.

Example 2

A two-component polyurethane coating composition was prepared in a similar manner to sample 2 in Example 1, except that the diluents shown in Table 2 below were used.

TABLE 2

| Diluent | Transparency | | | | Gloss (%) | |
|---|---|---|---|---|---|---|
| | 550 nm | 430 nm | 395 nm | Average | 20° | 60° |
| PGDA | 99.78 | 99.67 | 99.67 | 99.71 | 82 | 91 |
| EGDA | 101.11 | 100.55 | 100.00 | 100.55 | 82 | 91 |
| PC | 100.55 | 101.10 | 100.00 | 100.55 | 82 | 91 |

As can be seen from table 2, EGDA and PC can provide the same gloss as PGDA, and even better transparency. It can be seen that a coating with excellent transparency and gloss can be obtained by using alkyl glycol esters, cyclic carbonate esters or combinations thereof as a diluent.

Example 3

In order to further optimize the proportion of diluent in component B, the curing agent was diluted with 40% PGDA and 30% PGDA, respectively. Other parameters and experimental conditions were similar to those in Example 1. The results were shown in the following table:

| Diluent | Transparency | | | | Gloss (%) | |
|---|---|---|---|---|---|---|
| | 550 nm | 430 nm | 395 nm | Average | 20° | 60° |
| PGDA 40% | 99.78 | 99.67 | 99.67 | 99.71 | 82 | 91 |
| PGDA 30% | 88.28 | 91.72 | 92.93 | 90.98 | 71 | 88 |

When the curing agent was diluted with 40% PGDA (i.e. the weight ratio of diluent to curing agent was 40:60), the transparency and gloss of the resulting coating were significantly better than those diluted with 30% PGDA.

While the invention has been described with respect to a number of embodiments and examples, those skilled in the art will appreciate that modifications may be made to the application without departing from the principles disclosed in the foregoing description. For example, without departing from the principles disclosed in the foregoing description, the technical solutions obtained by combining multiple features or preferred implementations described herein shall be understood to belong to the contents recorded herein. Such modifications are to be considered as included within the following claims unless the claims expressly state otherwise. Accordingly, the embodiments described in detail herein are illustrative only and do not intend to limit the scope of the invention which is to be given the full breadth of the appended claims and any and all equivalents thereof.

What is claimed is:

1. A two-component polyurethane coating composition comprising:
   component A comprising an aqueous dispersion of at least one hydroxyl functional resin; and
   component B comprising at least one non-hydrophilic isocyanate curing agent and at least one diluent,
   wherein the at least one diluent comprises at least one cyclic carbonate ester, and optionally, at least one alkyl glycol ester that does not have an ether bond;
   wherein the at least one cyclic carbonate ester comprises ethylene carbonate (EC), propylene carbonate (PC), 1,2-butylene carbonate and 2,3-butylene carbonate, or combinations thereof;
   wherein the at least one diluent further comprises at least one low boiling point solvent, and the at least one low boiling point solvent has a boiling point of 160° C. or lower, wherein the at least one low boiling point solvent comprises propylene glycol monomethyl ether acetate (PMA), dipropylene glycol dimethyl ether (DMM), methyl ethyl ketone (MEK), acetone, methyl isobutyl ketone, cyclohexanone, toluene, xylene, trimethylbenzene, solvent naphtha 100, 2-methyl propanol acetate (MPA) and n-butyl acetate (BAC), or combination thereof.

2. The two-component polyurethane coating composition according to claim 1, wherein weight ratio of the at least one diluent to the at least one non-hydrophilic isocyanate curing agent is in the range of from 30:70 to 90:10.

3. The two-component polyurethane coating composition according to claim 1, wherein the at least one alkyl glycol ester is present and comprises propylene glycol diacetate (PGDA), ethylene glycol diacetate (EGDA), ethylene glycol dipropionate (EGDP), or combinations thereof.

4. The two-component polyurethane coating composition according to claim 1, wherein the total weight of the at least one cyclic carbonate ester, and the optional at least one alkyl glycol ester when present, is from 10 to 100 wt. %, based on the weight of the at least one diluent.

5. The two-component polyurethane coating composition according to claim 1, wherein the at least one non-hydrophilic isocyanate curing agent comprises at least one aliphatic diisocyanate.

6. The two-component polyurethane coating composition according to claim 1, wherein the component B further comprises at least one hydrophilic isocyanate curing agent.

7. The two-component polyurethane coating composition according to claim 6, wherein the weight ratio of the at least one non-hydrophilic isocyanate curing agent to the at least one hydrophilic isocyanate curing agent is in the range of from 99:1 to 5:95.

8. The two-component polyurethane coating composition according to claim 1, wherein the two-component polyurethane coating composition obtained by mixing the component A and the component B has a particle size of from 10 to 1000 nm.

9. The two-component polyurethane coating composition according to claim 1, wherein the two-component polyurethane coating composition with the component A and the component B is mixed at a shear rate of from 10 to 104 s−1.

10. The two-component polyurethane coating composition according to claim 9, wherein the two-component polyurethane coating composition has a pot life of at least 4 hours after mixing the component A and the component B.

11. A coating formed from the two-component polyurethane coating composition according to claim 1, wherein the coating has a transparency of 95% or higher.

12. A coated article, comprising:
   a substrate selected from wood, wood composite, metal, plastic, paper, leather, ceramic, inner wall, outer wall, cement board, or combinations thereof; and
   the coating according to claim 11 at least partially coated on the substrate.

13. The two-component polyurethane coating composition according to claim 9, wherein the two-component polyurethane coating composition with the component A and the component B is mixed at a shear rate of from 102 to 103 s−1.

\* \* \* \* \*